Figure 1:
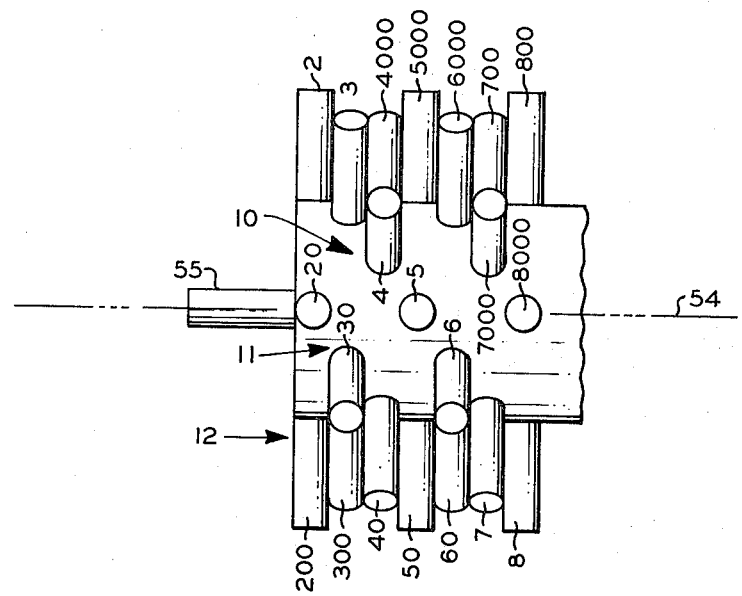

United States Patent [19]
Henderson

[11] 3,825,233
[45] July 23, 1974

[54] CARBON BLACK PELLETER

[75] Inventor: Eulas W. Henderson, Toledo, Ohio

[73] Assignee: Phillips Petroleum Company, Bartlesville, Okla.

[22] Filed: Feb. 14, 1972

[21] Appl. No.: 225,981

[52] U.S. Cl. .......................... 259/182, 259/DIG. 22
[51] Int. Cl. .............................. B01f 7/08, B01f 7/02
[58] Field of Search ......... 259/9, 10, 109, 110, 182, 259/DIG. 22; 23/314

[56] References Cited
UNITED STATES PATENTS

| | | |
|---|---|---|
| 2,306,698 | 12/1942 | Heller .................................. 23/314 |
| 2,422,989 | 6/1947 | Skoog ................................. 23/314 |
| 2,480,782 | 8/1949 | Skoog ......................... 259/DIG. 22 |
| 2,861,294 | 11/1958 | Glaxner ............................... 23/314 |

*Primary Examiner*—Robert W. Jenkins

[57] ABSTRACT

A carbon black pelleter in which the center lines of the pins on the shaft are spaced apart, when viewed in relation to the longitudinal axis of the shaft, a distance not greater than one pin diameter.

3 Claims, 2 Drawing Figures

PATENTED JUL 23 1974   3,825,233

CARBON BLACK PELLETER

This invention relates to a carbon black pelleter.

In one of its more specific aspects, this invention relates to a new and improved pelleter, the use of which produces a product of narrower range particle size.

The pelleting of carbon black is well known. In general, carbon black from the recovery system is pelleted to increase its density and facilitate its handling.

Pelleting is conducted by introducing particulate black and a pelleting agent into a pelleter which usually comprises a horizontally elongated chamber through which there extends a shaft on which pins are mounted to project radially outwardly into the elongated chamber. These pins are usually positioned along the shaft in a plurality of rows which are formed in a helical pattern around the shaft. When the shaft is rotated, the pins contact the carbon black and pellet it. Such apparatus is well known in the art as evidenced by such U.S. Pat. Nos. as 2,306,698 to Heller and 2,861,294 to Glaxner et al., the disclosures of which are incorporated herein by reference.

Carbon black pelleters produce a product of various ranges of pellet sizes, instead of a product of essentially uniform pellet size. The pelleter of the present invention is one which produces a product having a narrow range of pellet sizes.

The apparatus of this invention provides an improvement in the pelleters of the prior art, this improvement relating to the arrangement on the pins on the shaft. On the shaft of this invention, the pins are mounted to project radially from the shaft, being positioned around the circumference of the shaft in at least two rows of helixes, and preferably four. The pins of each helix are spaced apart along the length of the shaft at a distance no greater than one pin diameter, preferably substantially at a distance of one pin diameter.

As a result of this arrangement, the pelleter of the present invention, although employed at relatively low shaft rotational speeds, produces a larger proportion of carbon black pellets of a mesh size within the range of 18 to 35 mesh.

Figure 2:
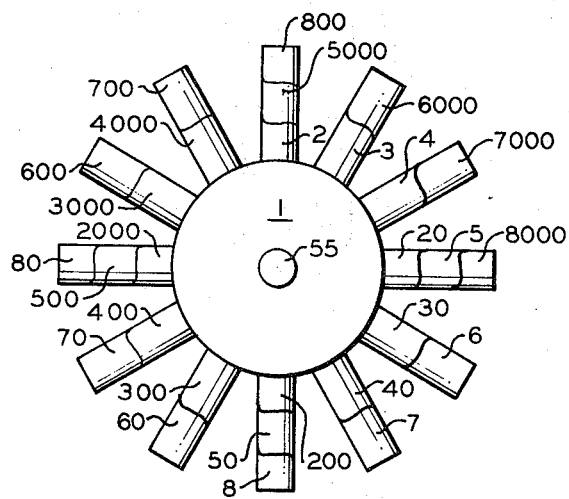

The apparatus of this invention will be more easily understood if explained in conjunction with the attached drawings in which FIG. 1 presents a view of the pelleter shaft in elevation, and FIG. 2 presents a cross-sectional view of the pelleter shaft through section 2—2 of FIG. 1.

Referring now to FIG. 1 there is shown a portion of shaft 1 which is adapted terminally with means 55 for support and rotation. Along its length are located a multiplicity of pins 2, 3, 4, etc., 20, 30, 40, etc., and 200, 300 and 400, etc., extending radially outwardly from the shaft.

The length, materials of construction, and related factors can be as conventional within the prior art and form no part of this invention. Rather, it is the positioning of the pins along the length of the shaft which is pertinent.

The pins are positioned such that at least two helixes of pins are formed along the length of the shaft, these helixes being positioned at any desired pitch along the shaft, that is, such that any desired number of pins can be positioned between pins of the same helix correspondingly located. In other words, pins 2, 3, 4, 5, 6, 7 and 8 form a portion of helix 10, these pins forming helixes around the shaft. However, the downstream edge of pin 2 is in substantial alignment with the upstream edge of pin 3 and the downstream edge of pin 3 is in substantial alignment with the upstream edge of pin 4. Hence, pins 2 and 4 are separated by the diameter of pin 3 and the distance, taken along the longitudinal axis 54 of the shaft, between the center lines of any two adjacent pins, is not greater than one pin diameter. Alternately expressed, the downstream edge and the upstream edge of adjacent pins intersect a common plane substantially perpendicular to the longitudinal axis of the shaft. Preferably, their edges will be on that imaginary plane.

This same arrangement is provided for helix 11 comprised of pins 20, 30, 40, etc., and for helix 12 comprised of pins 200, 300, 400, as well as for that helix (beginning with pin 2,000), the first pin of which is positioned on that diameter on which pin 20 is positioned as shown in FIG. 2.

Summarily then, the shaft of this invention contains a plurality of pins positioned in at least two rows helically encircling the shaft, the successive pins in the same helix being positioned substantially one pin diameter apart when the pins are considered as positioned along the longitudinal axis of the shaft. While the helixes can encircle the shaft at any pitch, preferably they will form an angle of about 30° with the longitudinal axis of the shaft. Preferably, each shaft will be adapted with four helixes.

The apparatus of this invention is employable under those conditions employed in the prior art, including pelleting agents, speed of rotation and the like. In the employment of the pelleter of the present invention, the comparatively close spacing of the pins results in the entire bed of carbon black being contacted with any one row of pins as it is turned into the bed. Since, in the projected view, there is no spacing between the pins, there is no segment of the bed which escapes pin contact on each successive rotation of the pins through the bed. For this reason, inasmuch as all carbon black is equally contacted, a more uniform pelleting of the carbon black results.

It is evident that various modifications can be made to the method of this invention. Such modifications are considered, however, to be within the scope of the invention.

What is claimed is:

1. In a carbon black pelleter, the improvement comprising:
   a. a pelleter shaft; and,
   b. a plurality of pins mounted on said shaft and projecting radially therefrom, said pins being positioned in a plurality of rows helically positioned along the length of said shaft, said pins being arranged in four helixes and spaced apart a distance such that adjacent pins intersect a common plane substantially perpendicular to the longitudinal axis of said shaft.

2. The pelleter of claim 1 in which the downstream edge and the upstream edge of adjacent pins lie on said common plane.

3. The pelleter of claim 1 in which said helixes are positioned around said shaft at about a 30° pitch.

* * * * *